(12) United States Patent
Ward

(10) Patent No.: US 9,488,182 B2
(45) Date of Patent: Nov. 8, 2016

(54) CONTROL SHAFT SEAL

(75) Inventor: Daniel N. Ward, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 482 days.

(21) Appl. No.: 13/699,313

(22) PCT Filed: May 24, 2011

(86) PCT No.: PCT/US2011/037639
§ 371 (c)(1),
(2), (4) Date: Nov. 21, 2012

(87) PCT Pub. No.: WO2011/149867
PCT Pub. Date: Dec. 1, 2011

(65) Prior Publication Data
US 2013/0089411 A1  Apr. 11, 2013

Related U.S. Application Data

(60) Provisional application No. 61/348,877, filed on May 27, 2010.

(51) Int. Cl.
| | |
|---|---|
| *F01D 11/00* | (2006.01) |
| *F04D 27/00* | (2006.01) |
| *F01D 17/16* | (2006.01) |
| *F02B 37/18* | (2006.01) |
| *F02B 37/24* | (2006.01) |
| *F02B 39/00* | (2006.01) |
| *F04D 29/10* | (2006.01) |
| *F04D 27/02* | (2006.01) |

(52) U.S. Cl.
CPC ........... *F04D 27/002* (2013.01); *F01D 17/165* (2013.01); *F02B 37/186* (2013.01); *F02B 37/24* (2013.01); *F02B 39/00* (2013.01); *F04D 27/0246* (2013.01); *F04D 29/102* (2013.01); *Y02T 10/144* (2013.01)

(58) Field of Classification Search
CPC ...... F01D 17/14; F01D 17/16; F01D 17/165; F04D 27/002; F04D 27/0246; F05D 2270/101
USPC ............ 415/150, 152.2, 159, 163, 164, 165, 415/166
See application file for complete search history.

(56) References Cited

U.S. PATENT DOCUMENTS

| | | | |
|---|---|---|---|
| 6,210,106 B1 | 4/2001 | Hawkins | |
| 6,599,087 B2 * | 7/2003 | Arnold | ......................... 415/163 |
| 2002/0098080 A1 | 7/2002 | Arnold | |

(Continued)

FOREIGN PATENT DOCUMENTS

| | | |
|---|---|---|
| EP | 2067957 | 6/2009 |
| JP | 62156139 | 10/1987 |

(Continued)

*Primary Examiner* — Woody Lee, Jr.
(74) *Attorney, Agent, or Firm* — A. Michael Tucker; Stephen A. Pendorf; Patent Central LLC

(57) ABSTRACT

The propensity for gas leakage around a shaft, which connects volumes of differing pressures, in, e.g., a turbocharger is minimized in a simple cost-effective manner. The addition of a complementary pair of frusto-spherical, conical, or other profiles to the interface of the shaft and its bearing maintain concentricity of the shaft in its bore and thus improve the efficacy of existing sealing protocols.

16 Claims, 9 Drawing Sheets

(56) References Cited

U.S. PATENT DOCUMENTS

2005/0188694 A1    9/2005  Frankenstein
2008/0075583 A1*   3/2008  Schlienger et al. .......... 415/159
2009/0123272 A1    5/2009  Love
2009/0226304 A1*   9/2009  Frankenstein et al. ....... 415/159

FOREIGN PATENT DOCUMENTS

| JP | 01179132      | 12/1989 |
| JP | 2008542607    | 11/2008 |
| WO | 2004063535    | 7/2004  |
| WO | 2004063535 A1 | 7/2004  |

* cited by examiner

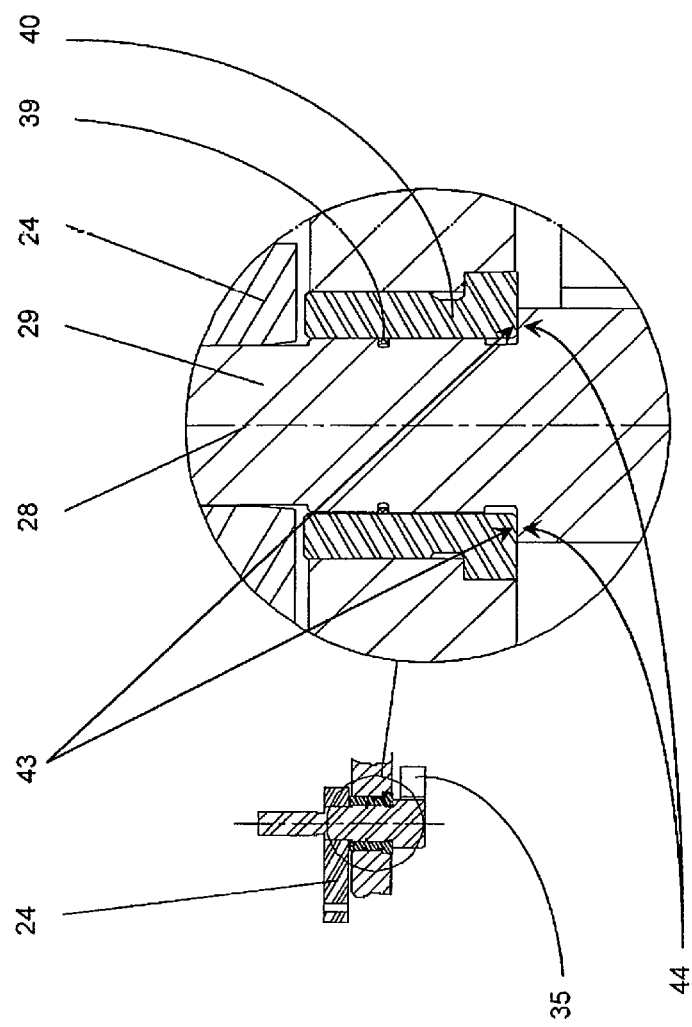

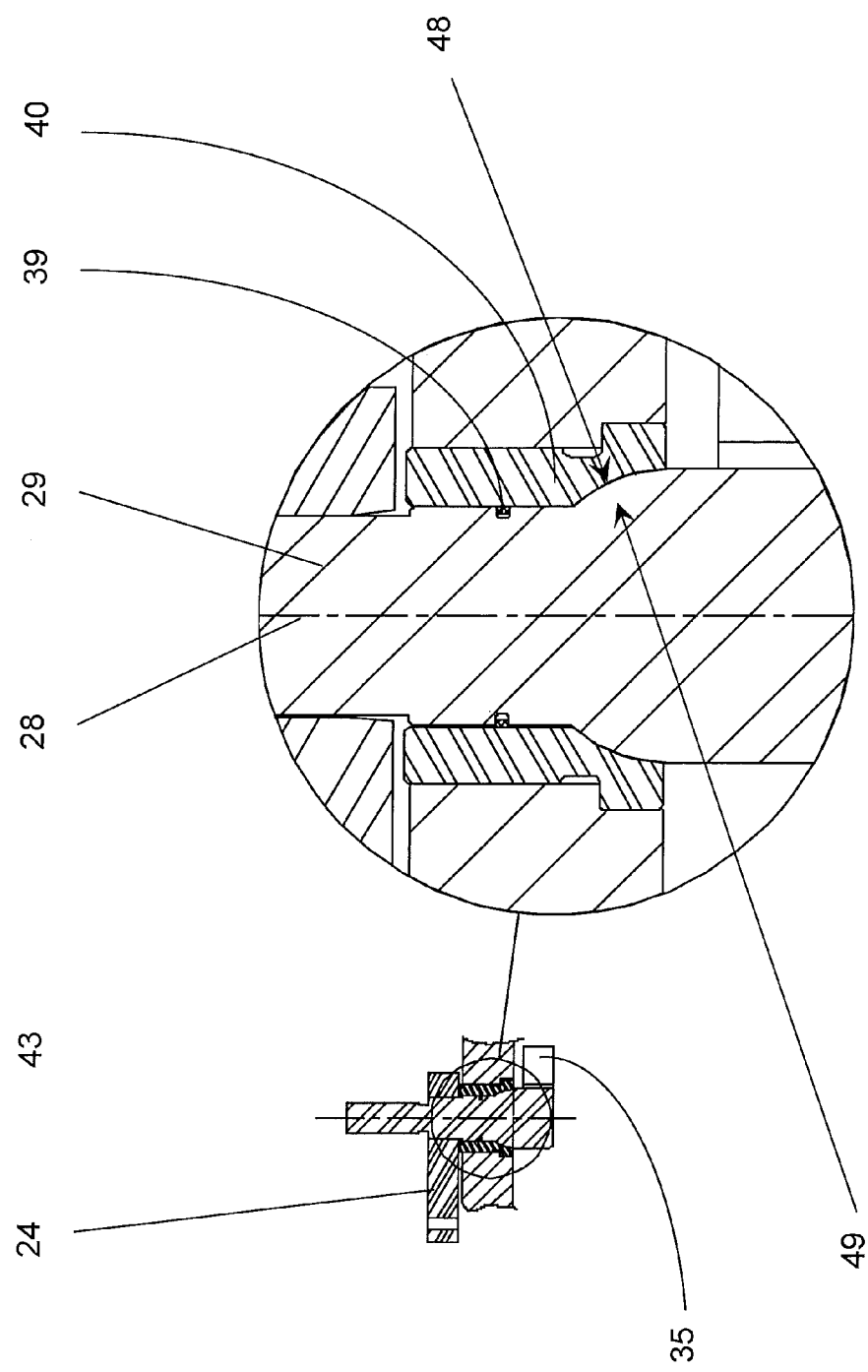

CONTROL SHAFT SEAL

FIELD OF THE INVENTION

This invention addresses the need for an improved shaft sealing design for turbocharger shafts which pass through the walls of the housing castings.

BACKGROUND OF THE INVENTION

Turbochargers are a type of forced induction system. They deliver air, at greater density than would be possible in the normally aspirated configuration, to the engine intake, allowing more fuel to be combusted, thus boosting the engine's horsepower without significantly increasing engine weight. A smaller turbocharged engine, replacing a normally aspirated engine of a larger physical size, will reduce the mass and aerodynamic frontal area of the vehicle.

Turbochargers use the exhaust flow from the engine exhaust manifold to drive a turbine wheel, which is located in the turbine housing. Once the exhaust gas has passed through the turbine wheel and the turbine wheel has extracted energy from the exhaust gas, the spent exhaust gas exits the turbine housing through the exducer and is ducted to the vehicle downpipe and usually to after-treatment devices such as catalytic converters, particulate traps, and $NO_x$ traps.

The basic turbocharger configuration is that of a fixed turbine housing. In this configuration, the shape and volume of the turbine housing volute is determined at the design stage and is cast in place. The basic fixed turbine housing is the most cost-effective option simply because it is the most simple and has the fewest parts.

The next level of sophistication is that of a wastegated turbine housing. In this configuration, the volute is cast in place, as in the fixed configuration above. The volute is fluidly connected to the exducer by a duct. Flow through the duct is controlled by a wastegate valve. Because the outlet of the wastegate duct is on the exducer side of the volute, which is downstream of the turbine wheel, flow through the wastegate duct, when in the bypass mode, bypasses the turbine wheel, thus not contributing to the power delivered to the turbine wheel. When a wastegated turbocharger is used, the wastegate arm part of the wastegate pivot shaft is connected to the wastegate valve on the inside of the turbine housing and to an actuator located external to the turbine housing. The wastegate pivot shaft extends between the turbine housing volute and the outside of the turbine housing, rotating in a cylindrical bearing, or directly in the turbine housing. Because a clearance exists between shaft and bearing bore, a flow of hot, toxic exhaust gas through this gap is possible.

The next level of sophistication in boost control of turbochargers is the VTG (the general term for variable turbine geometry). Some of these turbochargers have rotating vanes and some have sliding sections or rings. Some titles for these devices are: variable turbine geometry (VTG); variable geometry turbine (VGT); variable nozzle turbine (VNT); or simply variable geometry (VG).

VTG turbochargers utilize adjustable guide vanes (31) mounted so as to rotate between a pair of vane rings (30, 32) and/or one vane ring and a nozzle wall. These vanes are adjusted to control the exhaust gas backpressure and the turbocharger speed by modulating the exhaust gas flow to the turbine wheel. In many configurations the vane shaft (36), on which the vane rotates, is mechanically connected to a vane arm (33) situated above the upper vane ring. The vanes can be rotatably driven by forks (42) engaged in an adjusting ring (22). In many configurations, the forks on the ends of the vane arms drive independently rotatable "small turning blocks" (38) to minimize friction in the system and to deal with the inevitable distortion and corrosion in the turbine housing, and thus the linkages.

FIGS. 1A and 1B show a VTG configuration in which the adjusting ring (22) is supported by ramparts (34) on the vane arms (33). A large turning block (37) is connected by a shaft to the adjusting ring (22).

Displacement (by an actuator) of a control shaft (23) rotates the pivot arm (24) attached towards the outside end of a pivot shaft (29). Attached toward the inside end of the pivot shaft is a pivot shaft fork (35). The displacement of the control shaft (23) results in a rotation of the pivot shaft (29) about its axis (28). This rotation is carried inside the housing to translate into rotation of the pivot shaft fork (35). The rotation of the pivot shaft fork acts on the large turning block (37), which results in rotation of the adjusting ring (22) about the turbocharger centerline (1). The rotation of the adjusting ring (22) about the turbocharger centerline (1) causes the multiple small turning blocks (38) to rotate about the turbocharger center line (1) while each of the blocks is also free to rotate about the centerlines (27) of the vane shafts (36). This motion of the small blocks causes the vane arms (34) to rotate about the centerlines (27) of the vane shafts (36) and change the angle of attack of the vanes (31) to the exhaust flow.

Turbine housings experience great temperature flux. The outside of the turbine housing faces ambient air temperature while the volute surfaces contact exhaust gases ranging from 740° C. to 1050° C. depending on the fuel used in the engine. The complicated translated motions described above enable the actuator to control the flow to the turbine wheel in an accurate, repeatable, non jamming manner.

A VTG is used to control the flow of exhaust gas to the turbine wheel, and thus to drive the compressor to compress inlet air, as well as to control the turbine back pressure required to drive EGR exhaust gas, against a pressure gradient, into the compressor system to be re-admitted into the combustion chamber. The back pressure within the turbine system can be in the region of up to 500 kPa. This high pressure inside the turbine stage will result in escape of exhaust gas to atmosphere through any apertures or openings. Passage of exhaust gas through these apertures is usually accompanied by black soot residue on the exit side of the gas escape path. This soot deposit is unwanted from a cosmetic standpoint, and the escape of said exhaust gas containing CO, $CO_2$, and other toxic chemicals is a health hazard to the occupants of the vehicle, which makes exhaust leaks a particularly sensitive concern in vehicles such as ambulances and buses. From an emissions standpoint, the gases which escape from the turbine stage are not captured and treated by the engine/vehicle aftertreatment systems.

A typical method for minimizing the flow of exhaust gas through the aperture formed by a shaft rotating within a cylindrical bore is the use of a piston or seal ring. Piston rings are commonly used within a turbocharger to control the passage of oil and gas from the bearing housing to both compressor and turbine stages and vice versa. BorgWarner has had piston rings for this purpose in production since at least 1954 when the first mass production turbochargers were produced. For a slowly rotating shaft (as slow as 150 RPM, as compared to >150,000 RPM for the turbocharger rotating assembly), the same method and design is typically employed since the piston rings are in general inventory and function well as a gas passage inhibiting device.

In "slowly rotating shaft" usages such as those transmitting actuator driven VTG commands to rotate vanes or wastegate actuators commanding opening of wastegate valves, there often exist non-rotational forces twisting, rocking, or skewing these shafts. These motions can cause premature wear in the piston ring or it's mating grooves, and, at worst, can cause locking of the rotation or failure of the piston ring as it pinches in its grooves. These situations exacerbate the leakage of gases and particulate from the turbocharger to the exterior atmosphere.

Thus it can be seen that there is a need for a relatively simple, cost-effective design to enhance the seal-ability and life of the gas seal used for "slowly rotating" VTG and wastegate pivot shafts in turbochargers.

SUMMARY OF THE INVENTION

The present invention relates to a simplified, low cost, method for keeping an actuator pivot shaft concentric in its bore to enhance the sealing capability thus maximizing the retention of the exhaust gases within the turbocharger and minimizing the escape of said gases to the environment external to the turbocharger and accomplishes this by using a feature fabricated in the pivot shaft. More specifically, it has now been found that the addition of a complementary pair of frusto-spherical, conical, or other profiles to the interface of the shaft and its bearing maintain concentricity of the shaft in its bore and thus improve the efficacy of existing sealing protocols.

BRIEF DESCRIPTION OF THE DRAWINGS

The present invention is illustrated by way of example and not limitation in the accompanying drawings in which like reference numbers indicate similar parts, and in which:

FIGS. 4A, B depict a section view of an embodiment, with a magnified view of the bearing area;

FIGS. 6A, B depict a section view of the second embodiment of the invention, with a magnified view of the bearing area;

DETAILED DESCRIPTION OF THE INVENTION

Figure 1:
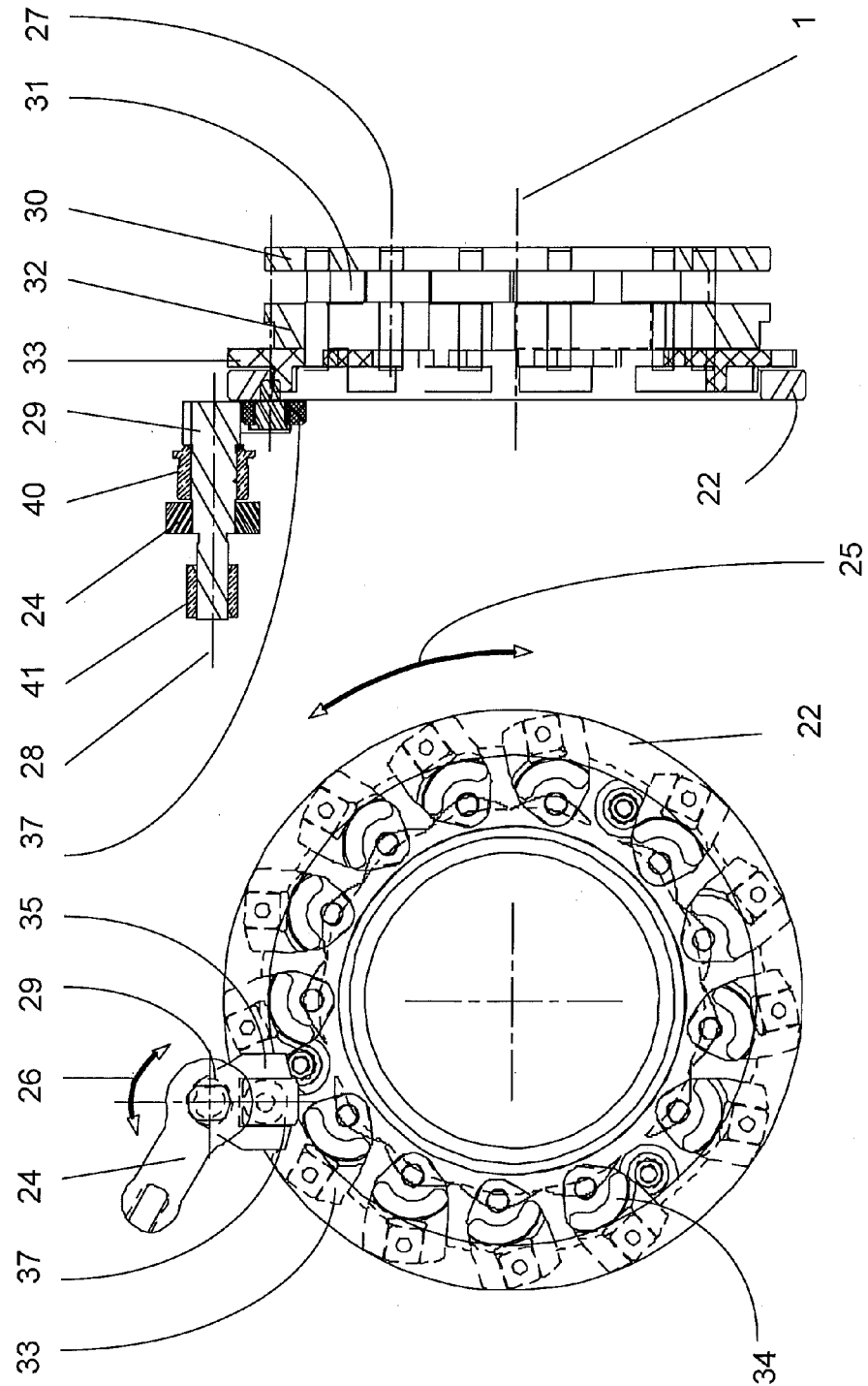
FIGS. 1A, B depict the section for a typical VTG turbocharger vane assembly.

Gas and soot leakage from within a turbocharger to the ambient clean air of the atmosphere surrounding a turbocharger is not permitted by engine manufacturers. Turbocharger manufacturers have been using piston rings, or seal rings, to seal gases and oil from communicating between the bearing housing cavity and either or both turbine and compressor stages ever since turbochargers were first in mass production in Diesel engines in the 1950s. So the engineering and application of such a seal is logical for any gas or material seal in less demanding locations on a turbocharger.

The typical seal ring, viewed from the side (radially), has a narrow rectangular cross section which is partially disposed in either an annular groove in the shaft, for which it provides sealing between the shaft and its bore, or in the bore in which the shaft rotates, or both. Axially, the seal ring is preferably positioned towards the center of the bore bearing surfaces. Radially the difference in relative position of the seal ring and its complementary groove(s) is based on function. If the seal ring provides axial location in addition to the gas or material seal function then the seal ring will partially reside in a groove in one component and partially reside in, or against, a groove or step in the other component in the set. If the function is purely that of gas or material seal, then only one component may have a groove fabricated in it, with the other component in the set having no groove or location. The groove is typically also rectangular in section with the radial depth of the groove greater than the corresponding side of the seal ring to allow assembly of the seal ring in the component while allowing the mating component to pass through the collapsed or expanded seal ring until it is in its assembled configuration. The width of the rectangular groove is ideally close to the width of the seal ring to provide optimum sealing. Typically the closer the widths of the groove and seal ring, the better the sealing capability.

Because of the hostile thermal and chemical environment, the VTG pivot shaft is typically not fitted directly to a bore directly in the turbine housing, but more often to a stationary bearing (40) located in a bore in the turbine housing. This in order to better match thermal coefficients of expansion (to maintain close clearances) and to inhibit the galling potential between the material of the pivot shaft and the material of the turbine housing. The bearing is typically axially constrained by a pin (59) through a bore perpendicular to the axis of the bearing, piercing both the outside diameter of the bearing and the bore in the turbine housing, thus constraining the bearing in the turbine housing.

In the cases where the shaft is transferring rotational motion from outside the turbocharger (for example from an actuator) to inside the turbocharger (for example to a VTG adjusting ring), there often are non-rotational forces tilting, rocking, bending or skewing the shaft in its bore. These non-functional forces may cause the seal ring to pinch in its groove, cause premature wear, or even failure of the seal ring or shaft and bore.

The inventor's analysis of a VTG pivot shaft using a typical piston ring as a seal, with the piston ring located in a groove located in the outer diameter of the shaft, sealing against the inner bore of the bearing, found that a tilt angle as little as ¼ of a degree was sufficient to pinch the ring in its bore. The larger the axial clearances between the sides of the piston ring and the cheeks of the groove, the less the potential for "pinching" initiated damage, but the greater the leakage path.

Figure 2:
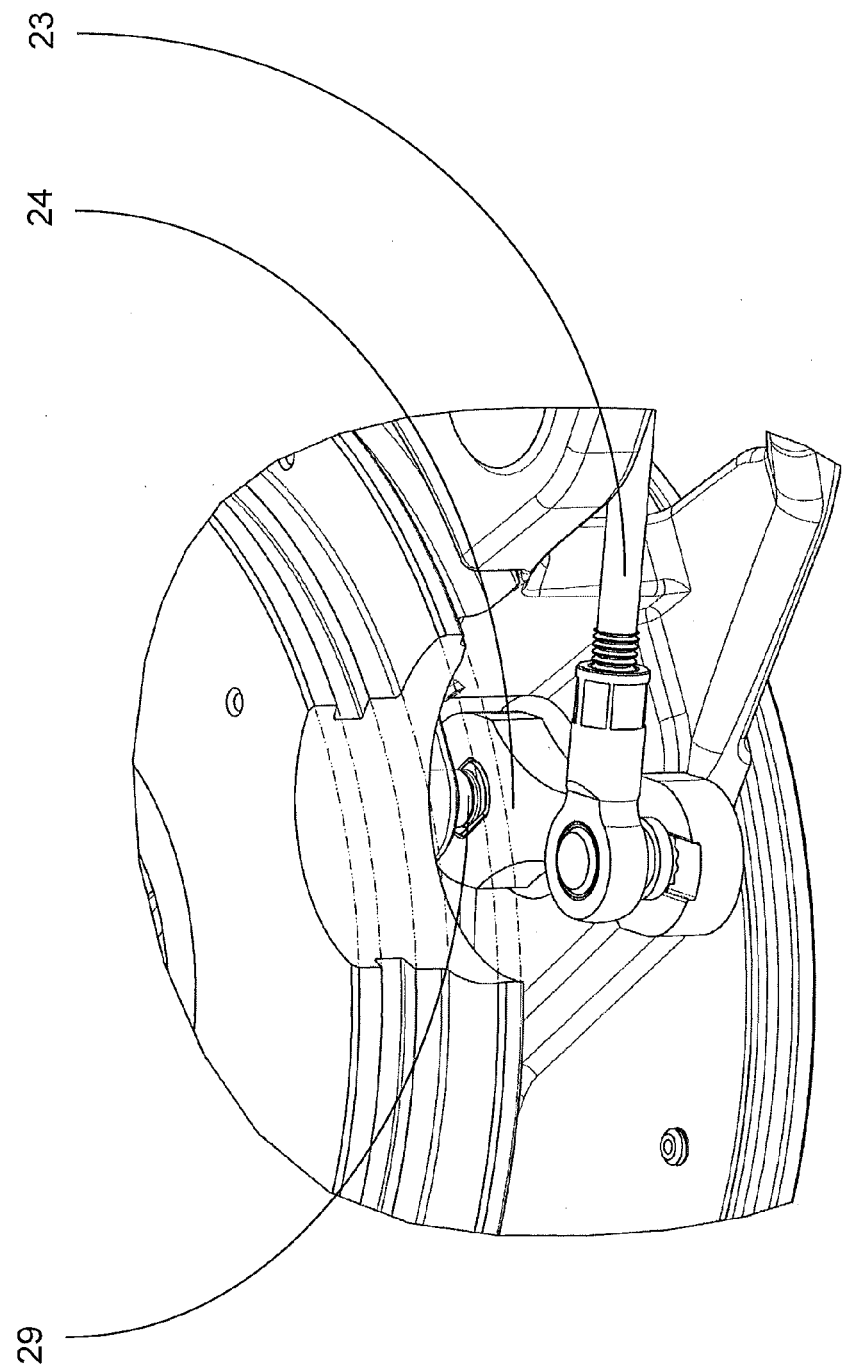
FIG. 2 is a depiction of the interface of control shaft to pivot shaft.
Figures 3A, 3B:
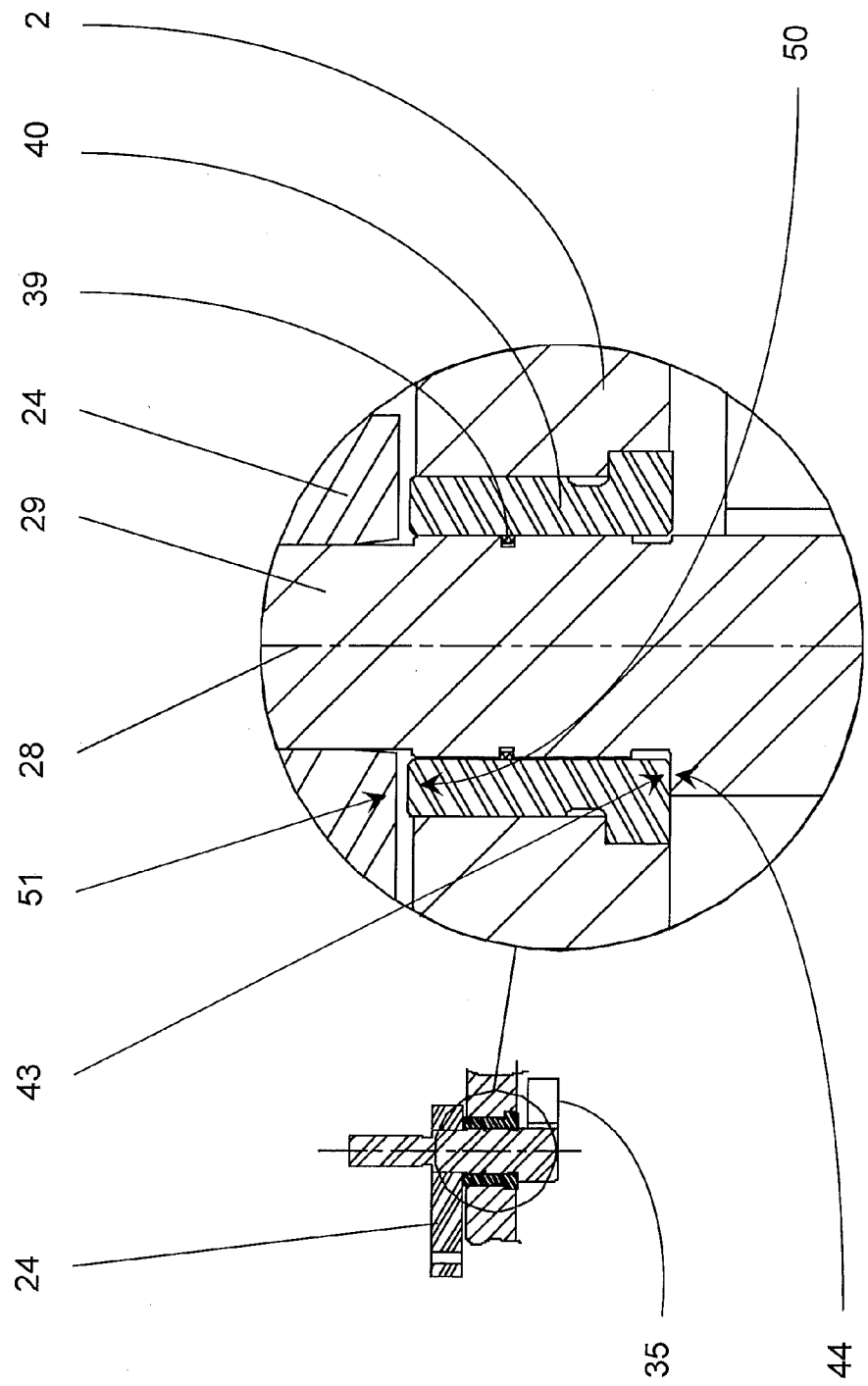
FIGS. 3A, B depict a section view of a prior art pivot shaft, with a magnified view of the bearing area.

A view from outside the turbocharger in question is depicted in FIG. 2. In this depiction, an actuator provides controlled displacement of a control shaft (23), which drives a pivot shaft arm (24), to rotate the pivot shaft (29). Inside the turbocharger, as depicted in FIG. 3, the pivot shaft (29) is radially located in a bearing (40), which is located either in a bore, with a centerline (71) within the turbine housing (2), or directly in the bearing housing depending on the design. The, in the figure, lower (inside) end of the pivot shaft (29) has a fork (35) fabricated onto the pivot shaft. This fork controls the position of the large turning block (37) as depicted in FIG. 1.

A piston ring (39) is located in a piston ring groove in the pivot shaft (29). In the prior art depicted, the shape of the lower fork provides an axial abutment (44) which does not provide location for a full 360° against the thrust face (43) of the bearing (40), which controls the axial position of the shaft toward the exterior of the turbocharger. Toward the outside of the turbocharger, the top side (50) of the bearing (40) provides a thrust face which works against an abutment on the pivot shaft arm (24) to provide axial control of the pivot shaft toward the interior of the turbocharger. This design allows a leak path not only between the abutment (44) and thrust face (43), but also around the seal ring (39) as the pivot shaft (29) is tilted.

As depicted in FIG. 4, a change to the design of the pivot arm fork enabled there to be a full 360° contact between the thrust face (43) of the bearing and the abutment (44) of the pivot shaft. While this design change did help the gas seal problem, it still allowed not only a leak path around the thrust interface (43, 44), but also around the piston ring (39) as the shaft tilted off the centerline (71) of the bore of the bearing.

Figures 5A, 5B:
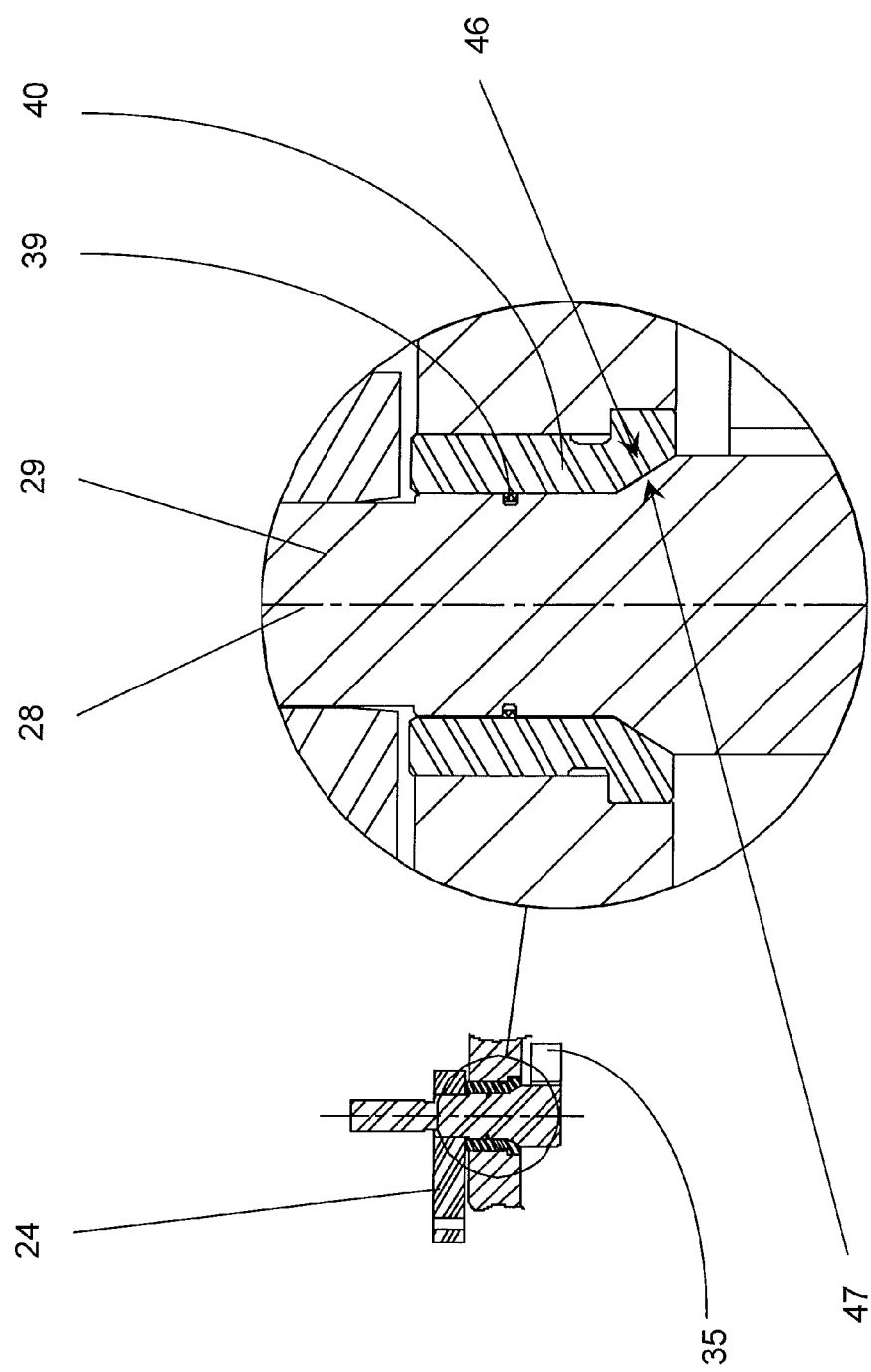
FIGS. 5A, B, depict a section view of the first embodiment of the invention, with a magnified view of the bearing area.

In the first embodiment of the invention, as depicted in FIGS. 5A and 5B, in order to cost-effectively constrain the pivot shaft (29) from tilting, while providing an axial thrust constraint, the inventors added a pair of self centering, complementary, mating contact surfaces to the pivot shaft and the bushing, for example, an exterior frusto-conical surface (46) in the bearing (40), and an interior frusto-conical surface (47), to the pivot shaft (29). The surfaces are referred to as "frusto" conical since the peak of the shape would be in the area occupied by the pivot shaft, and thus, would be "cut off". This frusto-conical interface prevents the pivot shaft from rocking and tilting on the bushing while centering the shaft in the bearing. One net effect of the frusto-conical interface is that the seal ring no longer must endure tilting of the relative alignment between the sides of the seal ring to the cheeks of the seal ring groove and also to any relative tilting between the outer diameter of the seal ring and the inner diameter of its mating bore in the bearing. Another net effect of the frusto-conical interface is that, since the shaft is now always in near 360° contact with the mating conical shape in the bearing, this interface acts as a seal and complements the gas and material sealing capabilities of the seal ring.

In the second embodiment of the invention, as depicted in FIGS. 6A and 6B, in order to cost-effectively constrain the pivot shaft (29) from tilting, while providing an axial thrust constraint, the inventors added a pair of self centering, complementary, mating contact surfaces to the pivot shaft and the bearing, for example, an exterior frusto-spherical surface (48) in the bearing (40) and an interior frusto-spherical surface (47) to the pivot shaft (29). The surfaces are referred to as "frusto" spherical since the peak of the shape would be in the area occupied by the pivot shaft, and thus, would be "cut off". This frusto-spherical interface prevents the pivot shaft from rocking and tilting on the bearing while centering the shaft in the bushing. One net effect of the frusto-spherical interface is that the piston ring no longer must endure tilting of the relative positions of the cheeks of the seal ring to the sides of the seal ring groove and also to any relative tilting between the outer diameter of the seal ring and the inner diameter of its mating bore in the bearing. Another net effect of the frusto-spherical interface is that since the shaft is now always in near 360° contact with the mating conical shape in the bearing, this interface also acts as a seal and complements the gas and material sealing capabilities of the seal ring.

In the second embodiment of the invention, as depicted in FIGS. 6A and 6B, in order to cost-effectively constrain the pivot shaft (29) from tilting, while providing an axial thrust constraint, the inventors added a pair of self centering, complementary, mating contact surfaces to the pivot shaft and the bearing, for example, an exterior frusto-spherical surface (48) in the bearing (40) and an interior frusto-spherical surface (47) to the pivot shaft (29). The surfaces are referred to as "frusto" spherical since the peak of the shape would be in the area occupied by the pivot shaft, and thus, would be "cut off". This frusto-spherical interface prevents the pivot shaft from rocking and tilting on the bearing while centering the shaft in the bushing. One net effect of the frusto-spherical interface is that the piston ring no longer must endure tilting of the relative positions of the cheeks of the seal ring to the sides of the seal ring groove and also to any relative tilting between the outer diameter of the seal ring and the inner diameter of its mating bore in the bearing. Another net effect of the frusto-spherical interface is that since the shaft is now always in near 360° contact with the mating conical shape in the bearing, this interface also acts as a seal and complements the gas and material sealing capabilities of the seal ring. With this interface, a contact seal is formed across the full length of the mating surface area (i.e. for the full contact area along the longitudinal axis through the bore).

As depicted in FIG. 1B, the typical pivot shaft has two bearings: a lower bearing (40) which is described above; and an upper bearing (41) which provides radial constraint for the outside end of the shaft. Since the upper bearing is already outside the exhaust gas holding part of the turbocharger, it requires no gas/liquid/solid sealing medium. In this configuration, for the same force and conditions exerted by the pivot shaft arm (24), the moments about the bearings are minimized; so the bearing loads are thus minimized. In the case (similar to that of a typical wastegate) in which there is no bearing outside the pivot shaft arm (24) (i.e. a cantilevered shaft), then the forces through the bearings are overhung and the forces transmitted to the bearings are much higher (a simple case of a cantilevered beam versus the case for a partially distributed load). Since there are many factors influencing the design of a turbocharger, the inventors realized that in order to maximize the efficacy of the seal ring, in the case of a cantilevered pivot shaft, the top side of the inner bearing (40) (in this case the only bearing) could also use a complementary pair of frusto-conical or frusto spherical surfaces for the purpose of preventing tilt, bending, or twist in the shaft.

Figures 7A, 7B:
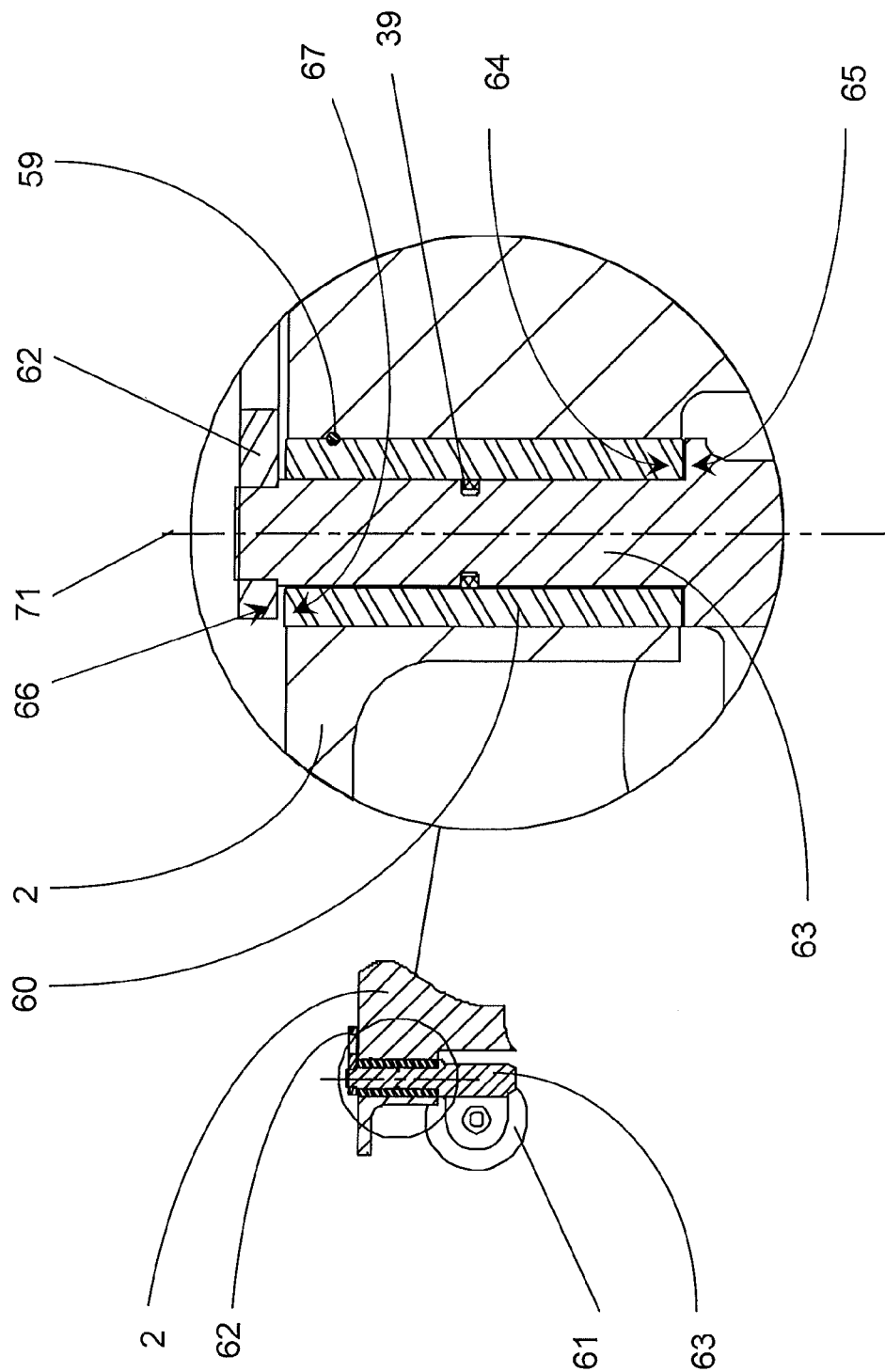
FIGS. 7A, B depict a section view of a prior art wastegate shaft, with a magnified view of the bearing area.

For a wastegated turbocharger configuration, the function, with respect to the constraints on the wastegate pivot shaft, is very similar to that of the VTG pivot shaft. As depicted in FIGS. 7A and 7B, a wastegate valve (61) is connected to a wastegate arm (62) in a manner which allows the wastegate valve to "wobble" on the attachment points so that the valve can tilt as it slides into the closed position. Typically the wastegate arm (62) is either welded to the wastegate pivot shaft (63) or cast as a single casting. The cylindrical shaft section of the wastegate arm assembly (shaft, arm, valve, valve attachment), pivots about an axis (71) co-incident with the axis of the bore in the turbine housing (2) and bearing (60).

The axial position of the wastegate arm assembly typically is constrained by the faces of the inner thrust face (64) and abutment (65) toward the inside of the turbine housing, and the outer thrust face (67) and abutment (66) toward the outside of the turbine housing. Often the abutment function on the outside of the turbine housing is provided by the inner surface of the wastegate control arm (74), which is assembled and fixed to the wastegate pivot shaft (63) after the latter is assembled to the turbine housing. This assembly is typically performed on the actual turbine housing assembly, rather than off-line and subsequently assembled into the turbine housing so there is no upper bearing, and the non-rotational forces on the wastegate arm (74) are overhung from the lower and only bearing (60).

Because of the hostile thermal and chemical environment, the wastegate pivot arm is typically not fitted directly to a bore in the turbine housing but more often to a bearing (60) located in a bore in the turbine housing in order to better match thermal coefficients of expansion (to maintain close clearances) and to inhibit the galling potential between the material of the pivot shaft and the material of the turbine housing. Many production wastegate configurations typically use a piston ring as a sealing device between the rotating shaft and the cylindrical bore in the bearing or turbine housing to limit the leakage of exhaust matter, although this sealing protocol was not used on earlier wastegated turbochargers.

Figures 8A, 8B:
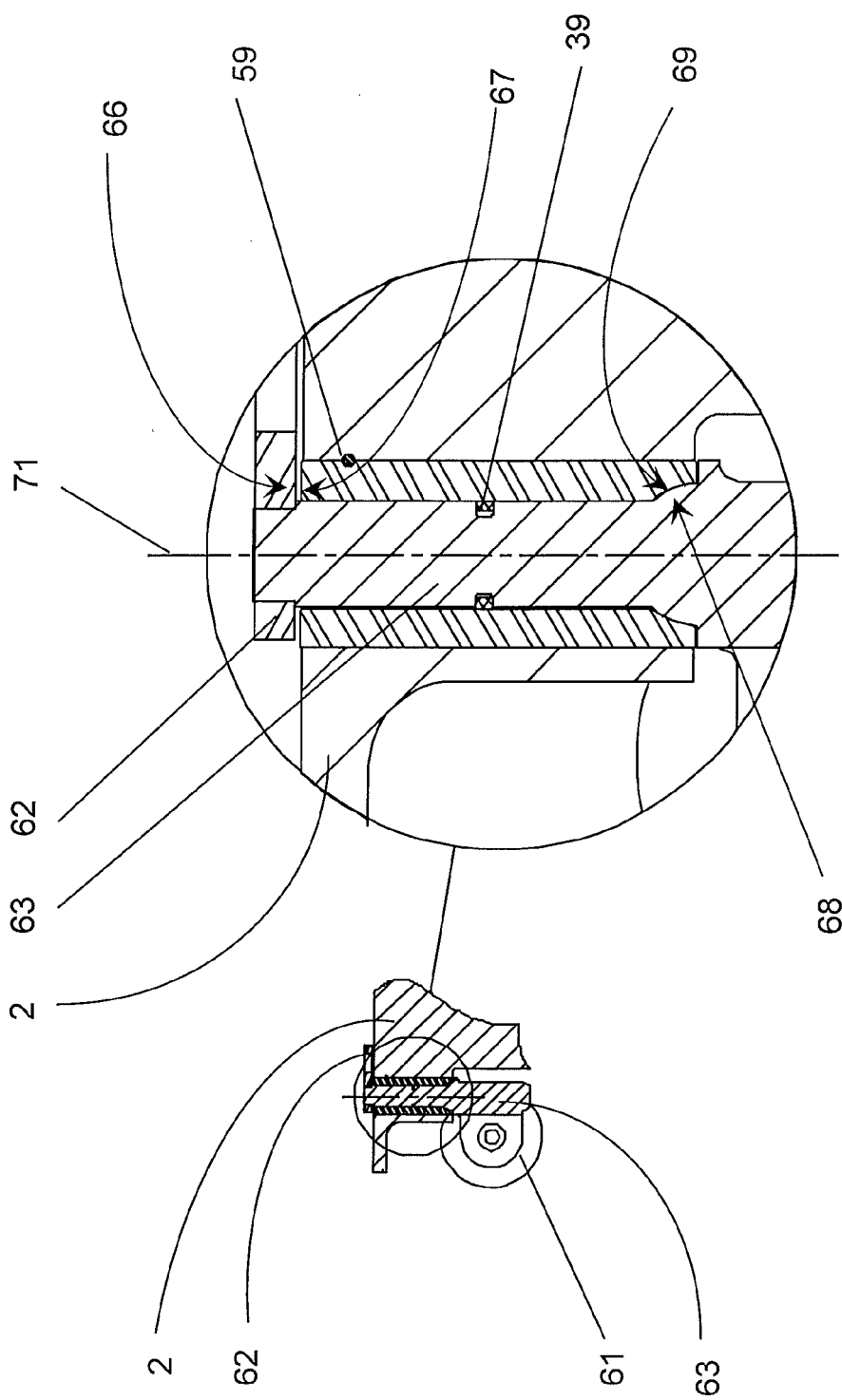
FIGS. 8A, B depict a section view of the third embodiment of the invention, with a magnified view of the bearing area.

In the third embodiment of the invention, as depicted in FIGS. 8A, 8B, the inventors added a pair of self centering, complementary, mating contact surfaces to the pivot shaft and the bearing, for example, an exterior frusto-spherical surface (69) in the bearing (60) and an interior frusto-spherical surface (68) to the wastegate pivot shaft (63). The surfaces are referred to as "frusto" spherical since the peak of the shape would be in the area occupied by the pivot shaft, thus, would be "cut off". This frusto-spherical interface prevents the pivot shaft from rocking and tilting on the bearing while centering the shaft in the bushing. One net effect of the frusto-spherical interface is that the piston ring no longer must endure tilting of the relative positions of the cheeks of the seal ring to the sides of the seal ring groove and in addition any relative tilting between the outer diameter of the seal ring and the inner diameter of its mating bore in the bearing. Another net effect of the frusto-spherical interface is that since the shaft is now always in near 360° contact with the mating conical shape in the bearing, this interface also acts as a seal and complements the gas and material sealing capabilities of the seal ring.

Figures 9A, 9B:
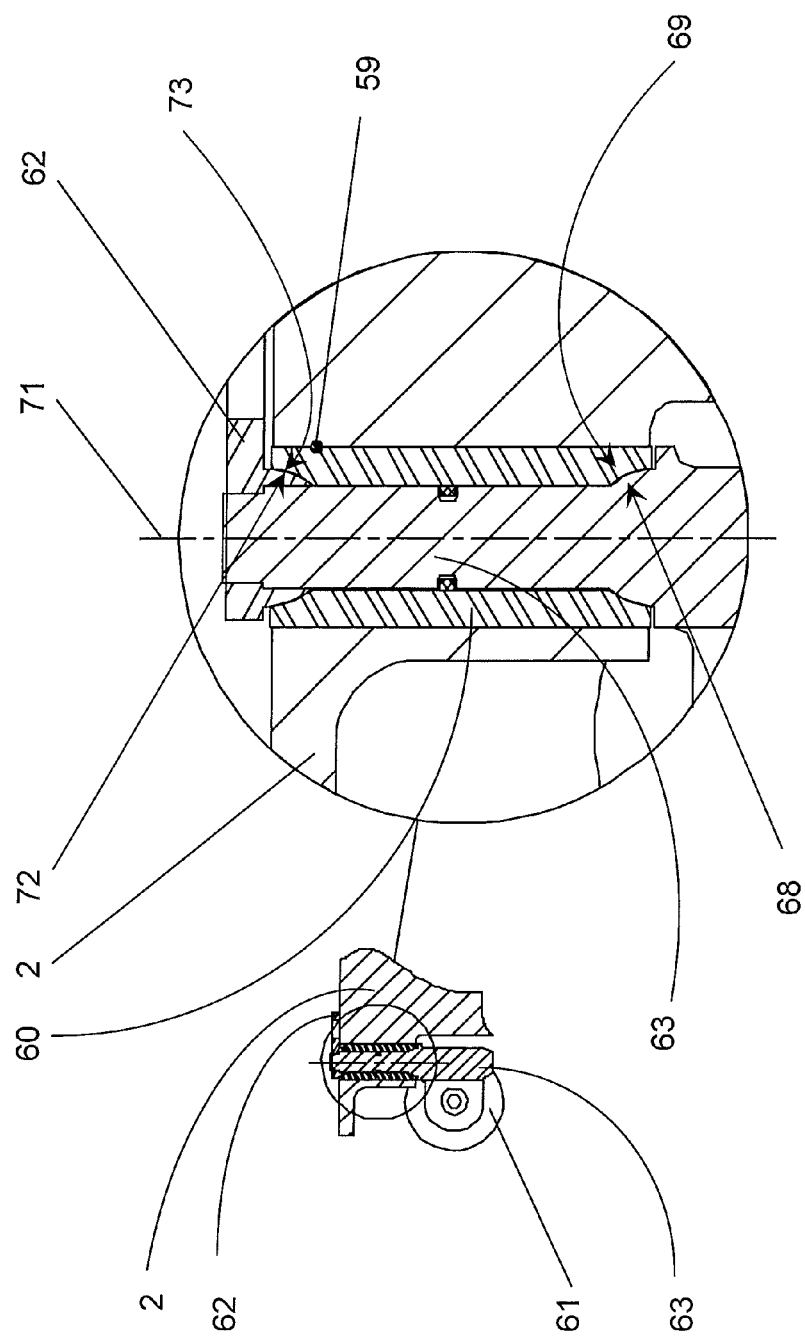
FIGS. 9A, B depict a section view of a variation to the third embodiment of the invention, with a magnified view of the bearing area.

In a fourth embodiment of the invention, where even better sealing is requested, as depicted in FIGS. 9A, 9B, the inventors added another pair of self centering, complementary, mating contact surfaces to the pivot shaft and the bearing, for example, an exterior frusto-spherical surface (73) in the bearing (60) and an interior frusto-spherical surface (72) to the wastegate pivot arm (63). The surfaces are referred to as "frusto" spherical since the peak of the shape would be in the area occupied by the pivot shaft, thus, would be "cut off". This frusto-spherical interface prevents the pivot shaft from rocking and tilting on the bearing while centering the shaft in the bushing when forces are applied inwards to the turbocharger. In typical wastegate actuators, air pressure (positive or vacuum) is applied against a diaphragm which exerts a force against (or with) a spring. The springs typically are coil springs with ground end faces. The loaded height of the spring is set by grinding the length of the spring so that the seat pressures exerted by the spring are close to the same, spring to spring. This protocol often results in the spring not exerting a force co-incident with the centerline of the actuator output rod. This phenomenon causes the actuator output rod to sit in a position at an offset angle from the desired centerline position. When assembled to the wastegate control arm (74), this undesired offset causes there to be a force acting axially on the wastegate pivot shaft (63). Depending on the offset angle (which can be anywhere in the 360° spectrum), the offset of the actuator rod could cause there to be an axially inwards force on the wastegate pivot shaft which could lift the inboard frusto conical/spherical surface from its outer mating surface and open a leakpath. By applying a pair of frusto-spherical/conical surfaces (72, 73) to the outboard end of the bearing, in addition to the already existing inboard frusto-spherical/conical interface, not only is there a constraint against the inboard force, but also there is a complementary sealing interface.

Further, it is not necessary that the interior of the vessel or flow conduit be at an elevated pressure relative to atmosphere. It is possible that the interior of the vessel or flow conduit have a sub-atmospheric pressure, or even that the interior fluctuate between over and under pressure. For example, both the inlet and exhaust systems of an engine contain many valves and the like to manipulate pressure differences from one part of the system to another in order to enable specific or transitory events to take place. Events such as EGR admittance, turbocharger overspeed prevention, turbocharger lag time prevention, exhaust braking, backpressure manipulation. At least one feature these valves typically have in common is that the actuation of said valves is driven from outside the conduit channel to provide motion/rotation of a device such as a valve or flapper inside the conduit channel. Typically the outside of the conduit channel is at ambient pressure and the inside is at a different pressure, be it positive, negative (e.g., compressor intake under choke or surge condition), transitory or a time-based combination of all. In each of these cases there exists a need for a cost-effective, centering, sealing, shaft seal design.

Although the shaft seal has been described herein with great detail with respect to VTG and wastegate embodiments suitable for a turbocharger, it will be readily apparent that the shaft seal is suitable for use in a number of other applications, such as an EGR butterfly valve, a valve or gate for controlling flow in divided turbine housing, or an exhaust flow bypass valve. The present disclosure of the preferred embodiments has been made only by way of example and that numerous changes in the details of structures and the composition of the combination may be resorted to without departing from the spirit and scope of the invention.

Now that the invention has been described,

I claim:

1. A turbocharger with:
   a turbocharger housing,
   an actuating mechanism (35) for actuating a device (22) within the turbocharger, and a pivot shaft (29) having an inside end inside the turbine housing and an outside end outside the turbine housing, and rotatably mounted in a bore in the turbocharger housing for transmitting an actuating movement from outside the turbocharger housing to the actuating mechanism (35),
   wherein the shaft or bore is provided with a seal (39),
   wherein the shaft includes a concentric, self-centering contact surface that complements and mates with a concentric, self-centering contact surface of the bore; the complementary, concentric, self-centering mating contact surfaces of the shaft and bore forming a full interfacing seal between the shaft and bore thereby preventing leakage and providing a means for centering and preventing tilt of the seal, and wherein a segment of the shaft passing through the bore narrows in diameter (47, 49) and a segment of the bore narrows in diameter (46, 48) complementary to the narrowing diameter of the shaft.

2. The turbocharger according to claim 1, wherein the self-centering contacting surfaces of the shaft and bore comprise one surface including an annular region of narrowing concavity and a complementary surface including a region of narrowing convexity, which cooperate such that, when the two surfaces are brought together, the narrowing concavity and the complementary narrowing convexity cause the shaft to center within the bearing, and wherein the shape of the narrowing convexity and concavity are frusto-conical, frusto-spherical, part conical, part spherical, mixtures of flat and conical or flat and spherical, combinations of differently angled conical surfaces, or combinations of different curvature surfaces.

3. The turbocharger according to claim 2, wherein the shaft and bore exhibit 360° concentricity at the mating contact surfaces.

4. The turbocharger according to claim 1, wherein the seal comprises a circumferential groove accommodating a sealing ring.

5. The turbocharger according to claim 4, wherein said sealing ring and said groove have a rectangular cross section.

6. The turbocharger according to claim 1, wherein said device is a variable nozzle device comprising an unison ring for actuating vanes forming nozzle passages.

7. The turbocharger according to claim 1, wherein said device is a wastegate.

8. The turbocharger according to claim 1, wherein said bore through said turbocharger housing is formed by a bushing having an inside end and an outside end.

9. The turbocharger according to claim 8, wherein the self-centering, complementary, concentric mating contact surfaces are formed in the bushing at the inside end.

10. The turbocharger according to claim 8, wherein the self-centering, complementary, concentric mating contact surfaces are formed in the bushing at the inside end and at the outside end.

11. The turbocharger according to claim 1, wherein the turbocharger has a compressor housing, a bearing housing, and a turbine housing, and wherein the bore extends through the turbine housing.

12. The turbocharger according to claim 1, wherein the turbocharger has a compressor housing, a bearing housing, and a turbine housing, and wherein the bore extends through the bearing housing.

13. A device for transmitting a rotational force through a wall separating a pressure differential, comprising:

a wall having first and second sides, with a first pressure on one side of the wall and a second pressure on the other side of the wall, a pivot shaft (29) having a first end on one side of the wall and a second end on the other side of the wall, and rotatably mounted in a bore extending through the wall for transmitting an actuating movement from one side of the wall to the other side of the wall, wherein the shaft or bore is provided with a seal (39), and wherein the shaft includes a concentric, self-centering contact surface that complements and mates with a concentric, self-centering contact surface of the bore; the complementary, concentric, self-centering mating contact surfaces of the shaft and bore form a full interfacing seal between the shaft and bore thereby preventing leakage and providing a means for centering and preventing tilt of the seal, wherein a segment of the shaft passing through the bore narrows in diameter (47, 49) and a segment of the bore narrows in diameter (46, 48) complementary to the narrowing diameter of the shaft, and wherein the self-centering contacting surfaces of the shaft and bore comprise one surface including an annular region of narrowing concavity and a complementary surface including a region of narrowing convexity, which cooperate such that, when the two surfaces are brought together, the narrowing concavity and the complementary narrowing convexity cause the shaft to center within the bearing, and wherein the shape of the narrowing convexity and concavity are frusto-conical, frusto-spherical, part conical, part spherical, mixtures of flat and conical or flat and spherical, combinations of differently angled conical surfaces, or combinations of different curvature surfaces.

14. The device according to claim 13, wherein the wall encloses a pressure or vacuum space.

15. The device according to claim 14, wherein the wall is the flow channel of an engine intake.

16. The device according to claim 15, wherein the flow channel encloses an internal space which during operation of the engine is sometimes at sub-atmospheric pressure and sometimes at above-atmospheric pressure.

* * * * *